(12) United States Patent
Guttenberger (10) Patent No.: US 7,394,176 B2
(45) Date of Patent: Jul. 1, 2008

(54) ELECTRIC DRIVE WITH SENSOR MOUNTED ON PRINTED CIRCUIT BOARD

(75) Inventor: Richard Guttenberger, Greding (DE)

(73) Assignee: Buehler Motor GmbH, Nuernberg (DE)

( * ) Notice: Subject to any disclaimer, the term of this patent is extended or adjusted under 35 U.S.C. 154(b) by 323 days.

(21) Appl. No.: 11/377,731

(22) Filed: Mar. 17, 2006

(65) Prior Publication Data

US 2006/0208586 A1    Sep. 21, 2006

(30) Foreign Application Priority Data

Mar. 18, 2005    (DE)    ........................ 10 2005 012 619

(51) Int. Cl.
*H02K 11/00*    (2006.01)
(52) U.S. Cl. ............... 310/68 R; 310/71; 310/68 B; 310/98
(58) Field of Classification Search ............... 310/68 R, 310/68 B, 68 D, 71, 98, 89–90
See application file for complete search history.

(56) References Cited

U.S. PATENT DOCUMENTS

| | | | | |
|---|---|---|---|---|
| 6,127,752 | A * | 10/2000 | Wiesler ..................... | 310/68 B |
| 6,201,326 | B1 * | 3/2001 | Klappenbach et al. ..... | 310/75 R |
| 6,249,068 | B1 * | 6/2001 | Knopp ........................ | 310/71 |
| 6,577,029 | B1 * | 6/2003 | Weber et al. ............... | 310/68 R |
| 6,713,913 | B1 * | 3/2004 | Hager et al. ................. | 310/89 |
| 6,759,783 | B2 * | 7/2004 | Hager et al. ................. | 310/239 |
| 6,873,076 | B2 * | 3/2005 | Kaeufl et al. ................. | 310/91 |
| 6,906,438 | B2 * | 6/2005 | Ursel et al. .................... | 310/89 |
| 6,977,458 | B2 * | 12/2005 | Kraus et al. .................. | 310/239 |
| 7,262,530 | B2 * | 8/2007 | Becker et al. ................. | 310/89 |
| 2006/0158057 | A1 * | 7/2006 | Huck et al. .................. | 310/239 |
| 2007/0018517 | A1 * | 1/2007 | Huck et al. .................. | 310/71 |

FOREIGN PATENT DOCUMENTS

DE          43 15 404 A1    11/1994

\* cited by examiner

*Primary Examiner*—Thanh Lam
(74) *Attorney, Agent, or Firm*—Jacobson Holman PLLC (57) ABSTRACT

An electric drive (1) with a motor housing (16), a bearing plate (4), an electrically insulating brush holder plate (3) with formed-on plug housing (11), a printed circuit board (13) with plug lugs 14 which project through plug recesses of the brush holder plate (3) into the plug housing (11), where the brush holder plate (3) serves as a carrier for the printed circuit board (13). The objective of the invention is to present an electric drive which can be securely mounted and handled in an economical manner in which many electric and electronic components are accommodated in a space-saving manner and which has good interference suppression characteristics. This objective is realized according to the invention by the fact that a sensor (23) is mechanically and electrically connected to the printed circuit board (13), the bearing plate (4) is electrically conductive, the printed circuit board (13) comprises tracks on both sides, the sensor (23) is held in a recess (25) of the printed circuit board (13), and a ground track (27) of the printed circuit board (13) faces the bearing plate (4) and is in direct electrical contact with it and mechanically fastened to it.

18 Claims, 7 Drawing Sheets

ELECTRIC DRIVE WITH SENSOR MOUNTED ON PRINTED CIRCUIT BOARD

BACKGROUND OF THE INVENTION

1. Field of the Invention

The invention relates to an electric drive for a motor, in general, and to an electric drive with a motor housing, a bearing plate, an electrically insulating brush holder plate with formed-on plug housing a printed circuit board with plug lugs which project through plug recesses of the brush holder plate into the plug housing, where the brush holder plate serves as a carrier for the printed circuit board, in particular.

2. Description of Related Art Including Information Disclosed Under 37 CFR 1.97 and 1.98

German Patent Application No. DE 43 15 404 A1 shows a generic electric drive in which a bearing plate cannot make contact with a printed circuit board found in the generic electric drive.

BRIEF SUMMARY OF THE INVENTION

An object of the present invention is to present an electric drive which can be securely mounted and handled in an economical manner in which many electric and electronic components are accommodated in a space-saving manner and which has good interference suppression characteristics.

This objective is realized according to the invention by the fact that a sensor is mechanically and electrically connected to a printed circuit board. A bearing plate is electrically conductive, and the printed circuit board comprises tracks on both sides. The sensor is held in a recess of the printed circuit board, and a ground track of the printed circuit board faces the bearing plate and is in direct electrical contact with it and mechanically fastened to it. Through the conductive bearing plate in the vicinity of the printed circuit board, contact to ground is easily produced. By disposing printed circuit board tracks on both sides and the sensor in a recess of the printed circuit board, more components can be accommodated in a space-saving manner. Through the combination of mechanical and electrical connection simple mounting of the printed circuit board is possible.

Good interference suppression results from short conductor connections. This is achieved in the present invention by the fact that the electrical connection between plug lugs and carbon brushes, which are mounted on the brush holder plate in tubular brush holders in such a manner that they can move in the axial direction, is produced via the tracks of the printed circuit board, where inductors on one side electrically contact these tracks and on the other side are electrically connected to carbon leads of the carbon brushes.

So that no additional parts are needed for the protective device, the protective device is formed as one piece with at least one of the components interconnected. Preferably the protective device is formed by initially forming an interconnection with at least one of the components. This is possible in particular with the use of injection molded plastic parts or diecast metal parts. Alternatively, the protective device can also be formed by initially forming an interconnection along with at least one of the components, for example, if the corresponding component is a punched bent part.

It is particularly advantageous if the protective device, when mounted, has a greater extension than the expandable catch means and, at least in the area of its greatest expandability, i. e. at its end area, projects over it in the direction of its connection and/or expansion. Thus it is insured that the protective device is always in contact with walls or other components during handling or mounting and not the expandable catch means.

Other objects, features and advantages of the present invention will be apparent to those skilled in the art upon a reading of this specification including the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE INVENTION

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Figure 1:
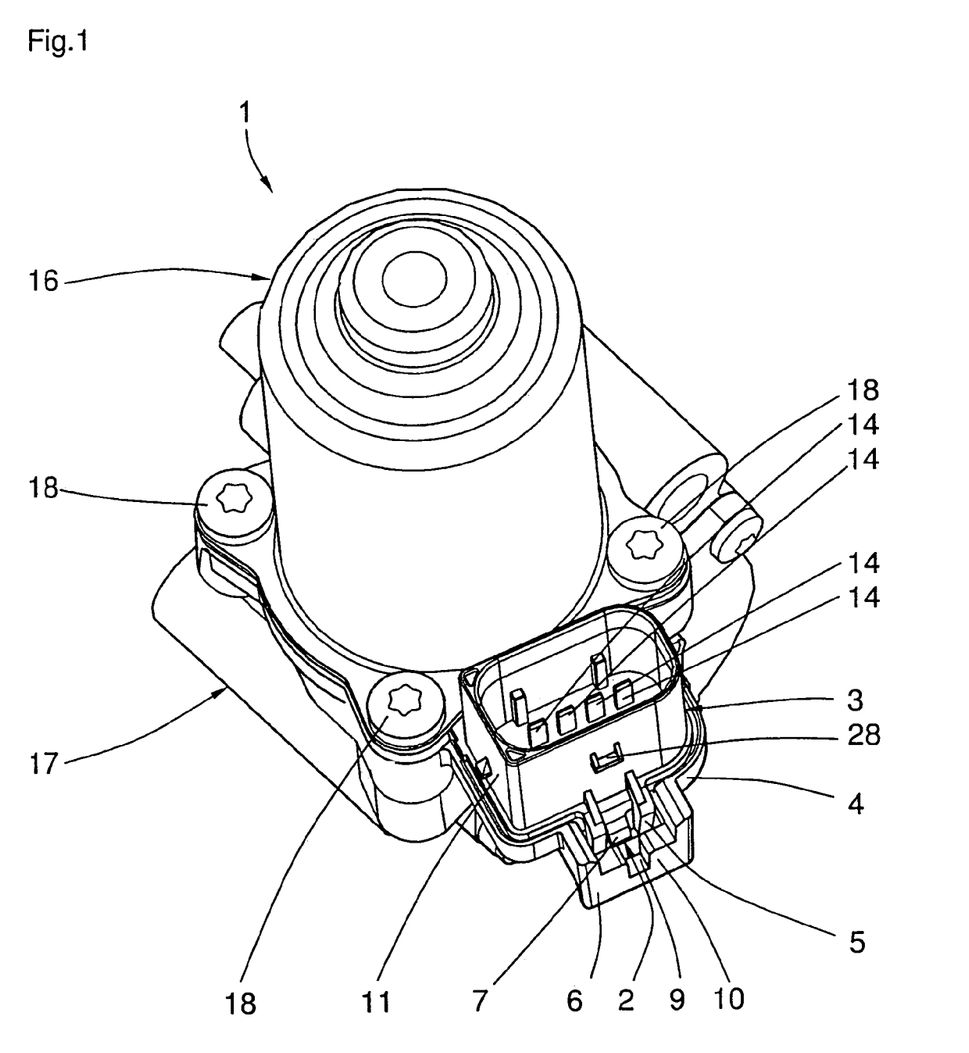
FIG. 1 is an offset perspective view of an electric drive embodying the present invention.
Figure 2:
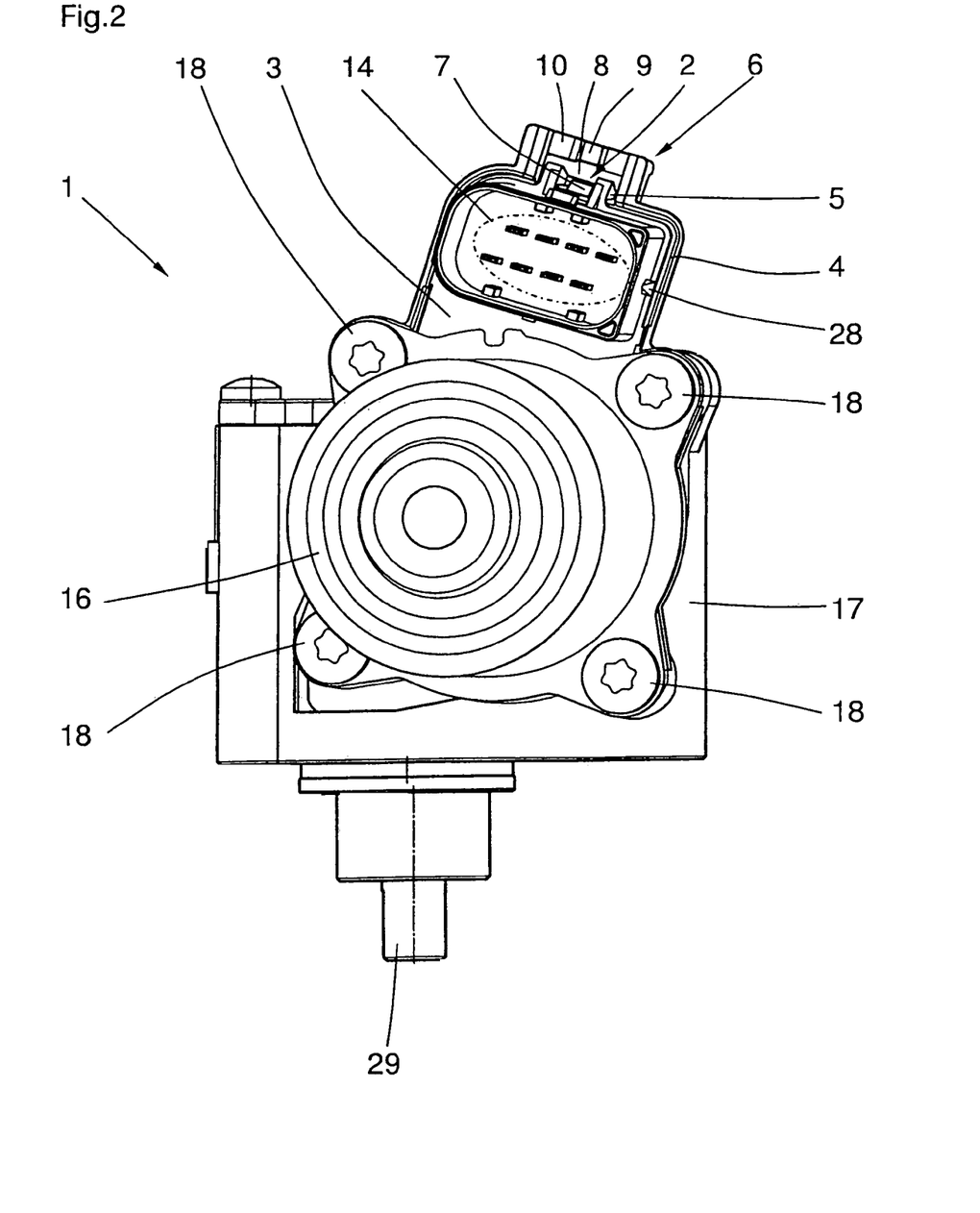
FIG. 2 is a top perspective view of the electric drive.

FIG. 1 shows a three-dimensional view of an electric drive 1 with a first component 3 formed as a brush holder plate and a second component 4 formed as a bearing plate. The brush holder plate is disposed, in the manner of a sandwich, between the housing 16 of an electric motor and the bearing plate 4 which is mechanically connected to a drive housing 17. The motor housing 16, the brush holder plate 3, the bearing plate 4, and the drive housing 17 are interconnected partly via fastening screws 18 and, in the area of a plug housing 11 formed as one piece with the brush holder plate, via a snap-on connector 2. In the plug housing plug lugs 14 are disposed which serve to connect the electric drive 1 to a power supply. The snap-on connector 2 consists of a catch nose 7 fixed with respect to the bearing plate and a catch eyelet 5 fixed with respect to the brush holder plate, the eyelet being expandable and having the catch nose 7 snapped in. So that the snap-on connector 2 is not unintentionally released or damaged during the mounting of the electric drive or its handling, a protective device 6 is provided. In order to enable the expansion of the catch eyelet 5, the protective device 6 is provided with a free space 8 (FIG. 2). The protective device 6 is formed in the form of a bridge 10 which is formed in one piece with the bearing plate. For reasons of forming technology a free recess (9) conforming to the catch nose 7 is provided in the bridge 10. The bridge is formed so that its supporting pillars first project in the radial direction from out of the brush holder plate 3 and the transverse yoke extends in the form of an L in the axial direction and the catch eyelet 5 is covered in this manner.

FIG. 2 shows a second three-dimensional view of the electric drive 1 with the brush holder plate 3, the bearing plate 4, the motor housing 16, the drive housing 17, and an output shaft 29. Here the protective device 6 can be seen more clearly with the free space 8 between the bridge 10 and the snap-on connector 2.

Figure 3:
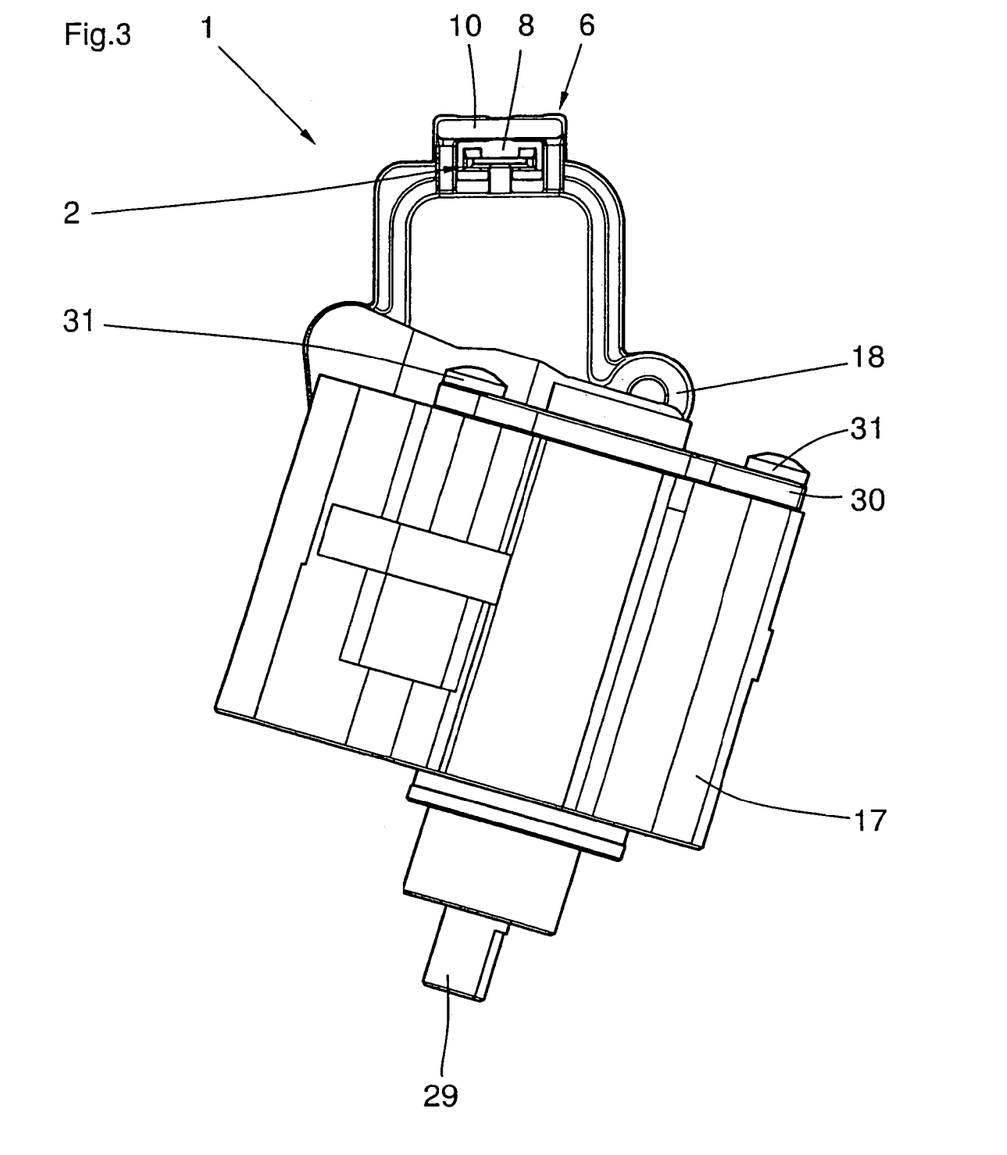
FIG. 3 is a side plan view of the electric drive.

FIG. 3 shows a plan view of the electric drive 1 with the protective device 6 for the snap-on connector 2, the drive housing 17 with a drive housing cover 30 which is fastened by means of drive housing screws 31 to the drive housing 17, and the output shaft 29.

Figure 4:
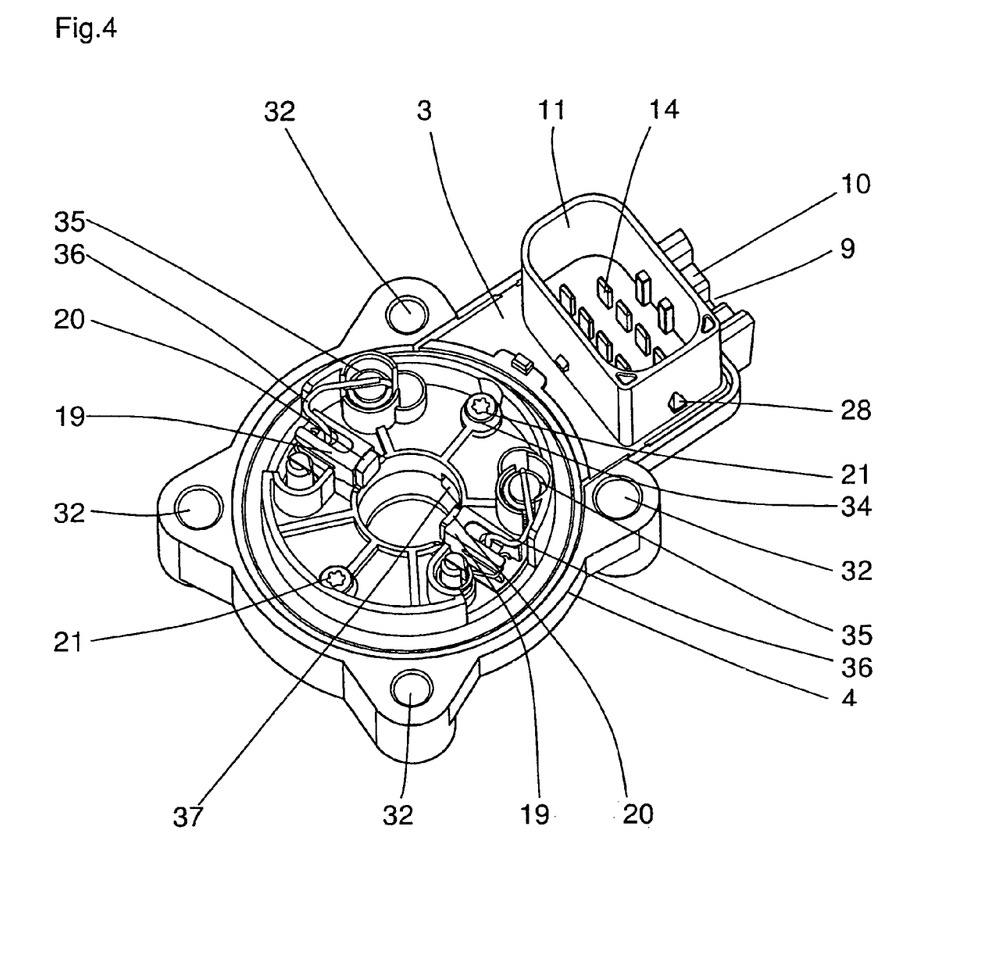
FIG. 4 is a top perspective view of a first component formed as a brush holder plate and mounted on a second component formed as a bearing plate.

FIG. 4 shows a three-dimensional representation of the first component 3 formed as a brush holder plate and mounted on the second component 4 formed as a bearing plate with the plug housing 11, the plug lugs 14, the bridge 10, and the free recess 9. The brush holder plate 3 is fastened by means of mounting screws 21 to the bearing plate 4 and provided with tubular brush holders 19 which serve to guide carbon brushes 20. The bearing plate 4 comprises fastening recesses 32 to receive the fastening screws 18. The brush holder plate 3 is equipped with inductors 35 which are electrically connected on one side to contact points 24 (FIG. 5) of the printed circuit board 13 and on the other side to carbon leads 36. In the brush holder plate 3 a free sensor recess 37 is provided in order to be able to position the sensor nearer to a rotor disposed on the motor shaft.

Figure 5:
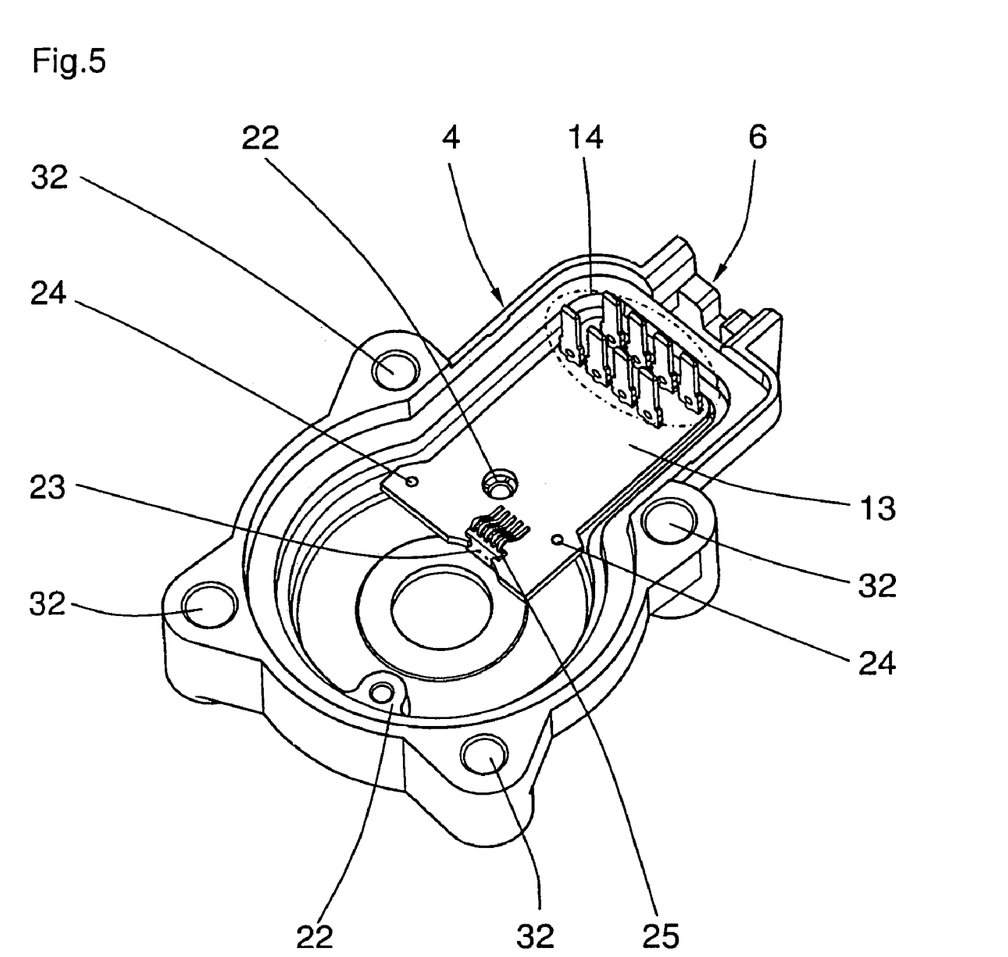
FIG. 5 is a top perspective view of the second component formed as a bearing plate.

FIG. 5 shows a three-dimensional representation of the second component 4 formed as a bearing plate which is provided with a printed circuit board 13 whose ground track is electrically connected to a screw dome 22 and thus to the bearing plate. The printed circuit board serves to electrically connect the plug lugs 14 to the carbon brushes (contact points 24) and the sensor 23, e. g. a Hall sensor, to detect the alternating magnetic field of a rotating rotor (not represented). The sensor 23 is fastened in a sensor recess 25 of the printed circuit board 13. The sensor 23 is disposed on a front side of the printed circuit board 13 which is thus fitted with components on three sides.

Figure 6:
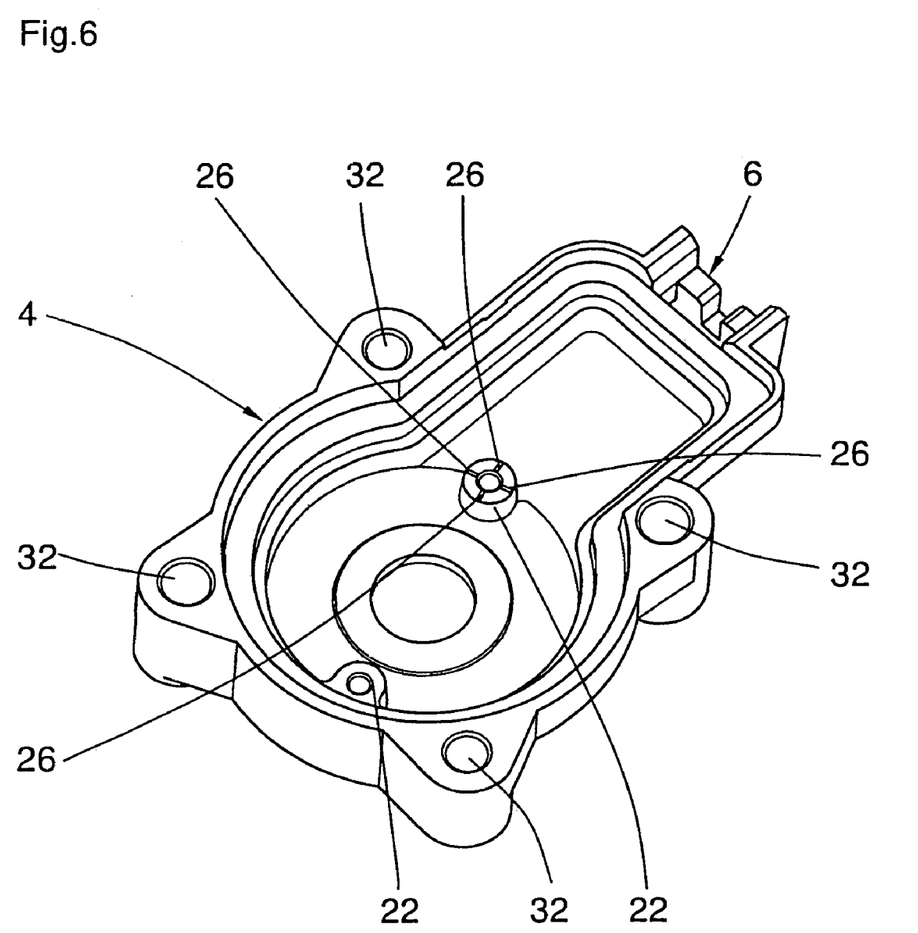
FIG. 6 is an additional top perspective view of the second component.

FIG. 6 shows an additional three-dimensional representation of the second component 4 without a printed circuit board, where the screw dome 22, which is electrically connected to the ground track 27 (FIG. 7) of the printed circuit board 13, is formed with projecting contact ribs 26 facing the printed circuit board 13. One screw dome 22 serves to fasten the printed circuit board as well as the brush holder plate and one screw dome 22 serves only to fasten the brush holder plate 3.

Figure 7:
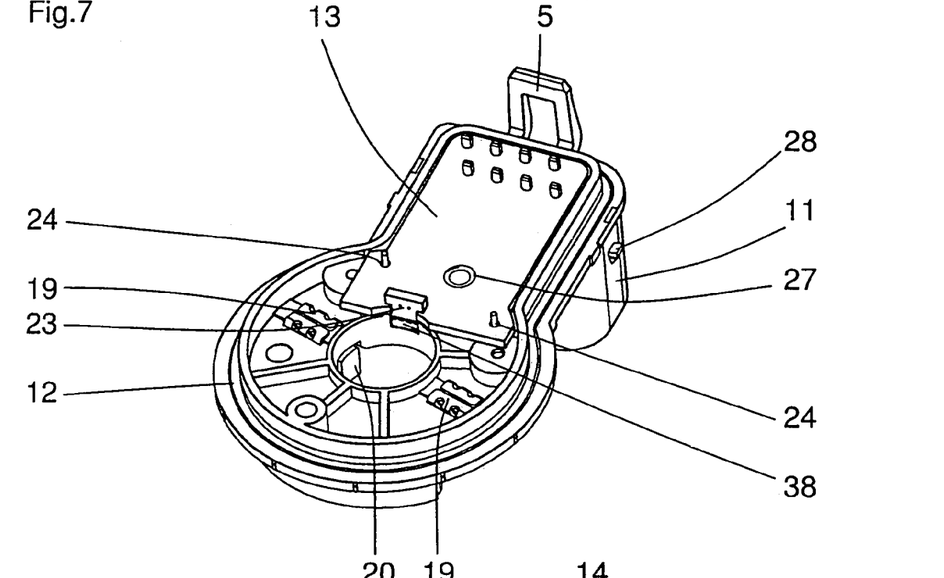
FIG. 7 is a top perspective view of the brush holder plate.

FIG. 7 shows a three-dimensional representation of the brush holder plate 3 with plug housing 11, catch eyelet 5, printed circuit board 13, sensor 23, ground track 27, contact points 24, tubular brush holders 19, carbon brushes 20, and plug lugs which mechanically and electrically are connected directly to the printed circuit board 13. The plug housing is formed by a catch means 28 which conforms to an opposing catch means in a supply line plug. In the brush holder plate 3 an encircling seal 12 is mounted which seals the electrical drive 1 against the effects of the environment. Relating to this, the snap-in connector 2 serves to ensure the sealing action of the seal 12. In case of unintentional loosening of the snap-in connector 2 the electric drive would leak.

Figure 8:
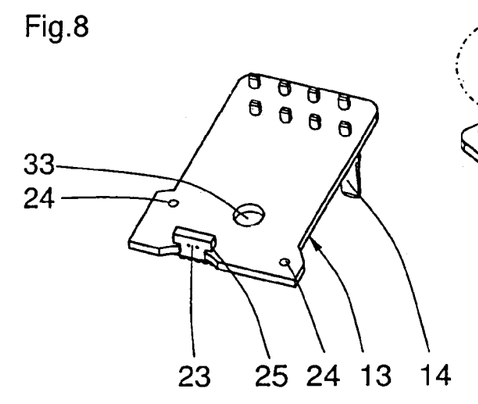
FIGS. 8 & 9 are perspective views of a printed circuit board found in the present invention.
Figure 9:
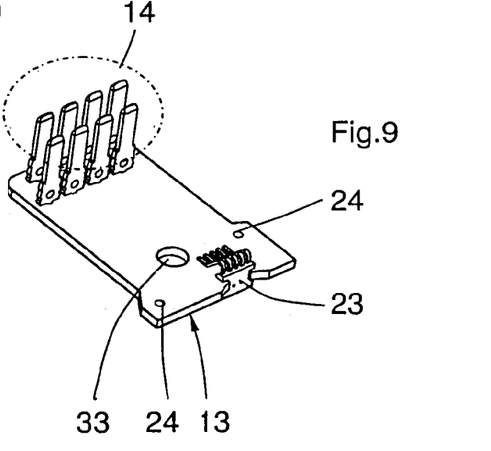

FIGS. 8 and 9 show the printed circuit board 13, with the plug lugs 14, sensor 23 which is mechanically fastened in the recess 25, the contact points 24, and fastening recesses 33 to receive the mounting screw 21 and for fastening the screw dome 22.

The structure defining the present invention provides an electric drive which can be securely mounted and handled in an economical manner in which many electric and electronic components are accommodated in a space-saving manner and which has good interference suppression characteristics. According to the invention by, the sensor 23 is mechanically and electrically connected to the printed circuit board 13, the bearing plate 4 is electrically conductive, the printed circuit board 13 comprises tracks on both sides, the sensor 23 is held in the recess 25 of the printed circuit board 13, and the ground track 27 of the printed circuit board 13 faces the bearing plate 4 and is in direct electrical contact with it and mechanically fastened to it. Through the conductive bearing plate in the vicinity of the printed circuit board, contact to ground is easily produced. By disposing printed circuit board tracks on both sides and the sensor in a recess of the printed circuit board, more components can be accommodated in a space-saving manner. Through the combination of mechanical and electrical connection simple mounting of the printed circuit board is possible.

Because the printed circuit board 13 comprises, in the area of its electrical connection point with the bearing plate 4, the fastener-receiving opening 33 and the fact that the screw dome 22, via which the mechanical and electrical connection to the printed circuit board 13 is produced, is of one piece with the bearing plate 4, there is a particularly simple mounting and electrical contractibility.

With reference to FIG. 4, the brush holder plate 3 comprises the brush holder plate recess 34 which conforms to the fastening free recess 33 of the printed circuit board 13. The brush holder plate 3 and the printed circuit board 13 are fastened to the screw dome 22 with the same mounting screw 21. In this way, two components can be mounted in one operational step.

Good interference suppression results from short conductor connections. This is achieved in the present invention by the fact that the electrical connection between the plug lugs 14 and carbon brushes 20, which are mounted on the brush holder plate 3 in tubular brush holders 19 in such a manner that they can move in the axial direction, is produced via the tracks of the printed circuit board 13, where inductors 35 on one side electrically contact these tracks 24 and on the other side are electrically connected to carbon leads 36 of the carbon brushes 20.

The installation space is particularly well utilized by the printed circuit board 13 being equipped on three sides with electric or electronic components. By the forming contact ribs (26) (FIG. 6) facing the printed circuit board 13 on the screw dome 22, a particularly reliable electric connection to ground is possible.

During the mounting of electric drives, no components may be damaged or unintentionally dismounted. This is ensured by the protective device 6 which shields the perceptibly expandable catch means 5 so that an undesired expansion is hardly possible.

So that no additional parts are needed for the protective device, the protective device is formed as one piece with at least one of the components interconnected. Preferably the protective device 6 is formed by initially forming an interconnection with at least one of the components 3, 4. This is possible in particular with the use of injection molded plastic parts or diecast metal parts. Alternatively, the protective device can also be formed by initially forming an interconnection along with at least one of the components 3, 4, for example, if the corresponding component is a punched bent part.

Since, in order to fulfill the desired requirements, the protective device must be implemented so as to be stable and robust, it is expedient to from it together with a fixed catch means as one piece on the same component. The fixed component can consist of a catch nose or also of several catch noses or of a catch recess.

As simple a form of the protective device as possible, and thus economically producible, is the protective device 6 in the form of the bridge 10 which bridges the at least one catch nose 7 or catch recess while retaining the free space 8. So that form release is economically possible with the use of an initial forming process, the free space 9 conforming to the at least one catch nose is made in the bridge-like protective device 6.

Because the component 3, 4 which comprises at least one expandable catch means 5 must be elastic, it is preferable that the catch means be implemented as an injection-molded plastic part. In so doing, fiber-reinforced plastic material is used in order to provide sufficient strength. The expandable catch means 5 can be formed as at least one catch eyelet 5 and in the mounted state engages behind the at least one catch nose 7 so as to be form-locking. Also the expandable catch means 5 can also be formed as at least one catch nose.

It is particularly advantageous if the protective device 6, when mounted, has a greater extension than the expandable catch means and, at least in the area of its greatest expandability, i. e. at its end area, projects over it in the direction of its connection and/or expansion. Thus it is insured that the protective device is always in contact with walls or other components during handling or mounting and not the expandable catch means.

The component 3, 4 with the expandable catch means 5 can, by way of example, be formed as one piece with the plug or plug housing 11. For both functions plastic material can be used, on the one hand due to its elastic, and on the other hand due to its insulating, properties.

The snap-on connector can be provided for compressing the seal 12, which is disposed between the two components 3, 4 to interconnect and seal them. Then it is particularly important to ensure a secure connection.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described. Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:
1. An electric drive comprising:
a motor housing;
an electrically conductive bearing plate;
an electrically insulating bush rocker having plug recesses, the bush rocker sandwiched between the motor housing and the bearing plate;
a plug housing formed on the bush rocker;
a plurality of plug lugs mounted on the bearing plate and projecting through the plug recesses into the plug housing;
a printed circuit board carried on the bush rocker;
a sensor mechanically held in a first recess of the printed circuit board and electrically connected to the printed circuit board;
a plurality of tracks including a ground track positioned on the printed circuit board so that the ground track faces the bearing plate, is in direct electrical contact with the bearing plate and is mechanically fastened to the bearing plate.

2. The electric drive according to claim 1, further comprising:
a fastening recess defined in the printed circuit board in the area of the electrical connection point of the printed circuit board with the bearing plate; and
a screw dome secured to the bearing plate in order to produce the mechanical and electrical connection of the bearing plate to the printed circuit board.

3. The electric drive according to claim 2, further comprising:
a second recess defined in the brush holder plate aligned with the fastening recess of the printed circuit board; and
a mounting screw for fastening the brush holder plate and the printed circuit board to the screw dome.

4. The electric drive according to claim 1, further comprising:
a plurality of carbon brushes, each brush having a carbon lead;
a plurality of brush holders for mounting the carbon brushes to the brush holder plate; and
a plurality of inductors connected at one end to the tracks and on the other end to the carbon leads.

5. The electric drive according to claim 1, wherein the printed circuit board is equipped on three sides with electric or electronic components.

6. The electric drive according to claim 2, further comprising:
contact ribs formed on a face of the screw dome and project in a direction away from the printed circuit board.

7. The electric drive according to claim 1, further comprising:
at least one snap-on connector for connecting the bearing plate to the brush holder plate wherein the connector includes an expandable catch means which is disposed projecting in an outer area of the electric drive; and
a protective device for protecting the expandable catch means against unintentional expansion of the catch means and thus loosening of the snap-on connector.

8. The electric drive according to claim 7, wherein the protective device is formed in one piece with at least one of the brush holder plate or the bearing plate to form an interconnected part.

9. The electric drive according to claim 7, wherein the interconnected part is a punched part.

10. The electric drive according to claim 7, where in the interconnected part is a molded plastic part or a diecast metal part.

11. The electric drive according to claim 7, wherein the protective device together with a fixed catch means is formed as one piece with one of the brush holder plate or the bearing plate.

12. The electric drive according to claim 7, wherein the fixed catch means is a catch nose or a catch recess.

13. The electric drive according to claim 10, wherein the plastic molded part is fiber-reinforced.

14. The electric drive according to claim 12, wherein the expandable catch means is formed as at least one catch eyelet and in the mounted state engages behind the at least one catch nose so as to be form-locking.

15. The electric drive according to claim 7, wherein the expandable catch means is formed as at least one catch nose.

16. The electric drive according to claim 7, wherein the protective device in the mounted state has a greater extension than the expandable catch means and, at least in the area of its greatest expandability, projects over it in the direction of its connection and/or expansion.

17. The electric drive according to claim 8, wherein the interconnected part is formed as one piece with the plug housing.

18. The electric drive according to claim 7, further comprising a seal disposed between the brush holder plate and the bearing plate.

* * * * *